(12) United States Patent
Wiebe et al.

(10) Patent No.: US 6,501,368 B1
(45) Date of Patent: Dec. 31, 2002

(54) ELECTRICAL CONTROL APPARATUS INCLUDING A PLURALITY OF PROGRAMMABLE MODULES

(75) Inventors: Cory James Wiebe, Winnipeg (CA); Mark Charles Poole, Winnipeg (CA); Walter Turchyn, Winnipeg (CA)

(73) Assignee: Vansco Electronics Ltd., Winnipeg (CA)

( * ) Notice: Subject to any disclaimer, the term of this patent is extended or adjusted under 35 U.S.C. 154(b) by 0 days.

(21) Appl. No.: 09/400,828

(22) Filed: Sep. 21, 1999

(51) Int. Cl.[7] .......................... G05B 23/02; G06F 19/00
(52) U.S. Cl. ................ 340/3.1; 340/825.22; 340/10.51; 701/33; 701/36; 701/32
(58) Field of Search .............................. 340/3.1, 825.22, 340/825.5, 3.43, 825.52, 3.5, 10.51, 10.52; 701/29, 31, 32, 33, 45, 49, 36

(56) References Cited

U.S. PATENT DOCUMENTS

| | | | |
|---|---|---|---|
| 5,233,346 A | * 8/1993 | Minerd et al. | ......... 340/825.52 |
| 5,408,229 A | * 4/1995 | Yabusaki et al. | ........ 340/825.5 |
| 5,826,211 A | * 10/1998 | Kobayashi | .................. 701/115 |
| 6,009,372 A | * 12/1999 | Baker et al. | ................ 701/115 |
| 6,138,059 A | * 10/2000 | Ozeki et al. | .................. 701/32 |
| 6,166,653 A | * 12/2000 | Schulmeyer et al. | ... 340/825.52 |
| 6,421,593 B1 | * 7/2002 | Kempen et al. | .............. 701/29 |

\* cited by examiner

*Primary Examiner*—Donnie L. Crosland
(74) *Attorney, Agent, or Firm*—Adrian D. Battison

(57) ABSTRACT

An electrical control system preferably for vehicles such as a transit vehicle is arranged with a plurality of separate modules each receiving input from a series of inputs and each providing a series of outputs so that the modules combined receive inputs from all of the control, transducer and other input elements of the vehicle and the modules as a whole provide output to all of the controlled elements of the vehicle. The modules communicate between one another via a communication bus and an operational program is installed in each of the modules so that all modules contain programming for the functions of each module. A replacement module is generic and thus can contain any operational program and thus can be used for many different designs of the system. As supplied, the module may contain an existing program or no operational program if not yet programmed. On a subsequent power-up after installation of the replacement module, a check program is run to determine that a replacement module is in place and to download the operational program from a selected one of the existing modules into the replacement module. This allows service personnel to readily install replacement modules without the necessity for dedication of the modules to specific design schemes.

22 Claims, 3 Drawing Sheets

ELECTRICAL CONTROL APPARATUS INCLUDING A PLURALITY OF PROGRAMMABLE MODULES

This invention relates to an electrical control apparatus for use in receiving input data from a plurality of separate sources and providing a plurality of outputs to separate controlled elements based upon a predetermined program, wherein the apparatus includes a plurality of separate control modules communicating on a connecting bus, and particularly to an improvement in which the modules can be readily replaced in the event of failure.

BACKGROUND OF THE INVENTION

Control apparatus for controlling electrical systems for various end uses are well known and widely required. The present invention is particularly but not exclusively concerned with such control apparatus for use in vehicles such as trucks, trains, boats, aircraft and passenger transit vehicles. However devices of this type can also be used for controlling industrial processes.

A vehicle such as a passenger transit vehicle has a large number of electrical inputs from operator actuated switches and from various other transducers such as temperature sensors and door closure switches. The vehicle further has a large number of electrical outputs where various components such as lighting, air conditioning, door actuators and engine control systems require output at a predetermined voltage from the power system of the vehicle.

One conventional arrangement for controlling the various outputs from the various inputs includes a plurality of control modules which are interconnected by a communication bus.

Each module has a series of input terminals for receiving control signals from a selected combination of the various inputs of the system. Each module has a plurality of outputs for supplying output voltage to selected ones of the series of controlled elements of the system. Each module has a plurality of switches which can be actuated to supply output as required to one or more of the output terminals. The switches are controlled by a processor in the module. The switches are preferably electronic but other electromechanical switches can be used in some cases. The module has a communications connection for two way communication between the processor and the communication bus so that the status of the module can be communicated onto the communication bus and so that information concerning the other modules can be communicated from the communication bus to the processor.

The modules are programmed with the necessary program to effect the function of each of the modules so that the modules are in effect identical and each can carry out the function of the others. This ensures that replacement modules for use in the event of a failure of one of the modules can simply be taken from a supply of the modules and can carry out whichever function is required of that particular module. An input arrangement provided by one or more conductors is provided for communicating to the module which function it is to undertake when installed in the vehicle.

The modules are programmable to provide a base program which carries out the basic functioning of the module and to receive an operating program relating to the functions of the modules.

It will of course be appreciated that the vehicles manufactured by a particular manufacturer using this system vary over the years as modifications are introduced and also may vary at any particular time due to different options and different configurations of the vehicles be manufactured.

The modules therefore must be programmed with the particular configuration of vehicle with which the module is to be used thus requiring an inventory of replacement modules dedicated to the particular vehicles concerned.

SUMMARY OF THE INVENTION

It is one object of the present invention therefore to provide an improved apparatus which avoids or reduces the necessity for an inventory of modules dedicated to different system configurations.

According to one aspect of the invention there is provided a control apparatus comprising:

a plurality of sources of input signals;

a plurality of controlled elements;

a communication bus;

and a plurality of separate control modules each having:
connection to the communication bus for transmitting communications on and receiving communications from the bus;

a plurality of input terminals arranged for receiving at least one input from a respective one of said plurality of sources of input signals;

a plurality of output terminals at least one of which is arranged for connection to a respective one of the controlled elements;

a plurality of switches each associated with a respective one of the output terminals for effecting control of the respective controlled element;

a processor programmable so as to actuate the switches in response to data from the input terminals and in response to said communications on the communication bus in accordance with a predetermined program stored in the module;

the modules each having a different function such that each receives input from a different one or more of the sources of input data and each effects control of a different one or more of the controlled elements;

wherein said predetermined program is the same in each of the modules and includes a base program and an operating program portion having respective sub-portions thereof with each sub-portion arranged to control the function of the respective module in which the program is stored;

and wherein the modules and the predetermined program therein are arranged such that, at a predetermined condition of the apparatus, the processor of each module emits to the communication bus a signal indicative of the operating program portion stored in the respective module, such that there is effected a comparison of the emitted signals, and such that, in the event that the emitted signal of one of the modules is different from that of the others, a selected one of the others is arranged to download the operating program portion from said selected one to said different one.

Preferably all of the modules are substantially identical and wherein each module has an input for determining which of the functions of the modules is applicable to that module. It is preferred to provide identical modules since this provides the best efficiency for inventory control. However in some cases, the modules may have different hardware configurations for effecting different functions, but contain the same base software for running the basic programs as described hereinafter and the same operating program programmed in the manner of the present invention and described herein.

Preferably the emitted signal comprises a reference number included in the operating program portion and identifying the operating program portion. This can be supplemented by an optional check sum calculated from the operating program portion to ensure checking of accuracy.

Preferably the apparatus includes a port connected to the communication bus for receiving programming information on the communication bus for simultaneously programming all of the modules with said operating program portion.

Preferably the predetermined condition is arranged to occur at an initial power-up of the apparatus.

Preferably each of the modules is arranged to be in an operating condition only in the event that it is receiving an input on one or more of a selected number of the input terminals thereof and wherein the predetermined condition is arranged such that each of the modules is receiving an input to said selected number of input terminals thereof such that each is in the operating condition.

Preferably the inputs to each module are arranged so that the predetermined condition only occurs at a power-up and only in the event that each of the modules is receiving an input to said selected ones of input terminals thereof.

Preferably the predetermined program is arranged, in the event that the emitted signal of one of the modules is different from that of the others, to select a particular one of the modules to download the operating program portion unless the particular one is the different one in which case selects another one of the modules is selected.

Preferably the selected one downloads the operating program portion in a plurality of separate sections of program each including a check sum.

Preferably the control apparatus is provided in a vehicle for controlling electrical components of the vehicle and in such a case, the modules may be located at different locations in the vehicle including at least one at the front, at least one at the rear and at least one at an intermediate location along the length thereof.

Preferably a first one of the modules is connected to a source of 12 vDC voltage and is arranged to control the switches thereof to provide the 12 vDC voltage as a high side output at least at some of the outputs thereof for supply to the controlled elements and a second one of the modules is connected to a source of 24 vDC voltage and is arranged to control the switches thereof to provide the 24 vDC voltage as a high side output at least at some of the outputs thereof for supply to the controlled elements. More preferably each module has two rails or input bars each of which can be supplied with either 12 vdc or 24 vdc, so that both rails are of the same voltage or each is of a different voltage depending upon the output requirements. Each module is preferably powered by a logic voltage which is either 24 v or 12 v depending upon the convenience of the system.

Preferably at least one of the first and second modules includes at least one further output arranged to be connected by a respective one of the switches, which is bi-directional, to ground such that said one further output provides a low side output.

Preferably each module includes a set of input status LEDs and a set of output status LEDs and wherein each input is associated with a respective one of the input LEDs and each output is associated with a respective one of the output LEDs and wherein the input LEDs are arranged to be on when an input is present and to be off when no input is present and wherein the output LEDs are arranged to be on when an output is present and to be off when no output is present and to flash when a fault is present on the output.

Preferably there is provided a diagnostic harness arranged to provide a feedback connection from respective ones of the output to respective ones of the inputs.

Preferably each module is arranged to provide a power save mode wherein the module goes power-off except when an input is provided to selected ones of the inputs thereto.

According to a second aspect of the invention there is provided a method of replacing a module in a control apparatus as defined above wherein the method comprises:

replacing one of the modules with a replacement module;

after replacement, at a predetermined condition of the apparatus, causing the processor of each module to emit to the communication bus a signal indicative of the operating program portion stored in the respective module;

causing the modules to effect a comparison of the emitted signals;

and, in the event that the emitted signal of one of the modules is different from that of the others, causing a selected one of the others to download the operating program portion from said selected one to said different one.

According to a third aspect of the invention there is provided an individual module for use in a system of the type defined above arranged by the program stored therein to effect the steps set forth in the method above when connected into the apparatus.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION OF PREFERRED EMBODIMENTS

Figure 1:
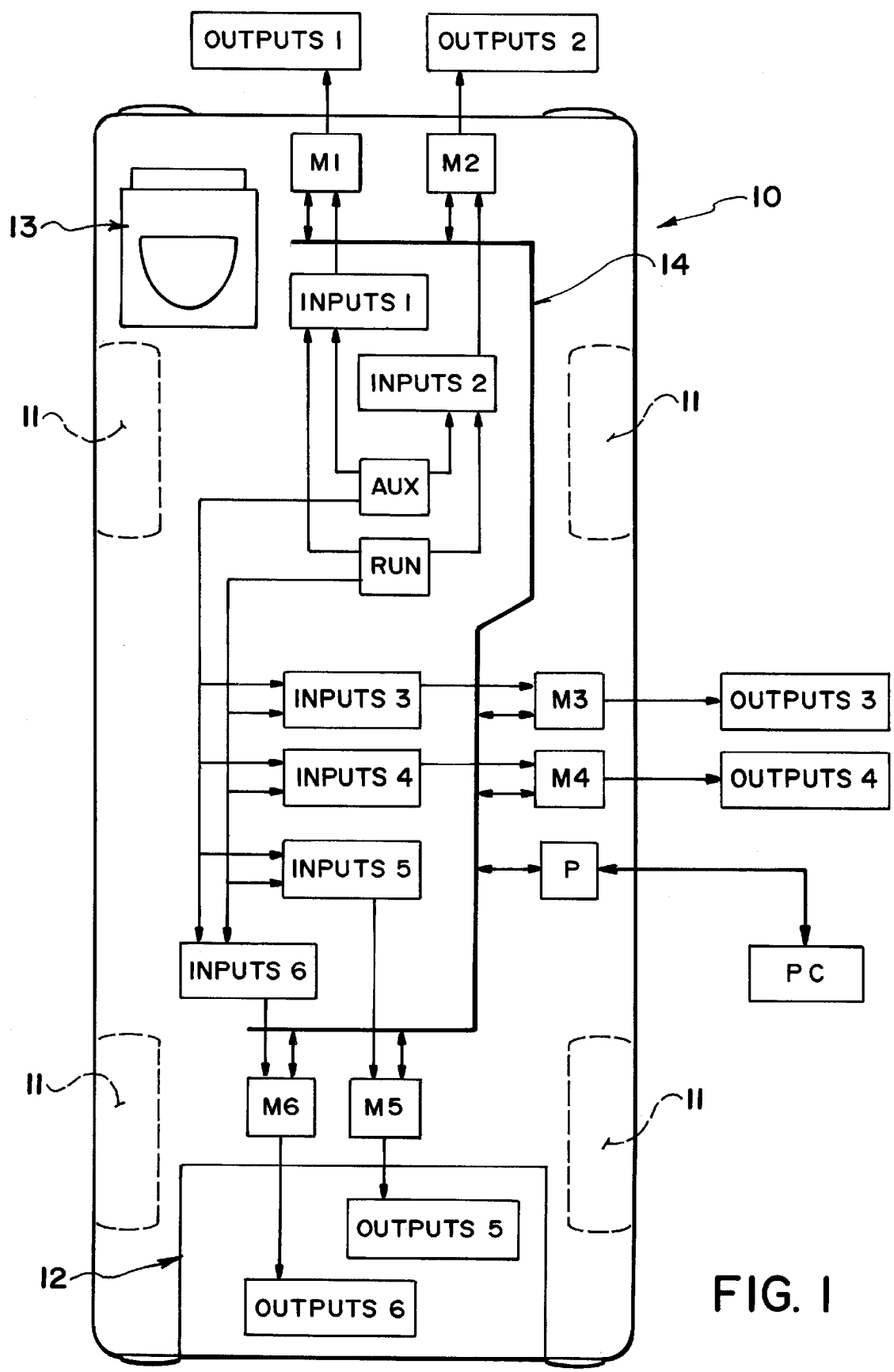
FIG. 1 is a schematic illustration of the control apparatus according to the present invention including a plurality of separate modules.

In FIG. 1 is shown a vehicle 10 having ground wheels 11, an engine compartment 12 containing an engine system (not shown) and an operator station 13 at which an operator is seated for controlling the vehicle in its various functions. All these elements are shown schematically since the details of these elements are well known to one skilled in the art.

The electrical system for controlling the vehicle comprises a communication bus 14 which runs through the vehicle from a forward position through to a rearward position. The system further includes a plurality of individual control modules M1, M2, M3, M4, M5 and M6. Each of these is connected to the communication bus by an individual connection communicating from the communication bus to a terminal on the module allowing two way communication between the module and the bus.

Each module has associated with it a series of inputs which are indicated at input 1 through input 6. It will be appreciated that this is a schematic illustration of a plurality of inputs defined by the combination of all of the inputs 1 through 6 and that each module has associated with it a selected group of the total number of inputs. The inputs comprise various different components of the vehicle including manually operable switches, transducers and sensors which are well known to one skilled in the art and therefore will not be described in detail.

Two of the inputs are indicated at AUX and RUN respectively and these are of course well known in a vehicle and relate to the ignition system by which the operator can switch the ignition to either a run condition or the AUX condition which thus activates many components of the system. These inputs form one of the inputs of each of the input combinations input 1 through input 6 and therefore each is communicated to the respective module as an input through that particular module. It will be appreciated therefore that some of the inputs are common to all of the modules and some of the inputs are individual to only one of the modules or one or two of the modules depending upon the design of the system and the functions to be effected. The AUX or RUN conditions are of course highly significant in the operation of the system and therefore are used as inputs to each of the modules. In some designs, the AUX and RUN inputs can be replaced by a single input generally known as MASTERPOWER, wherein the power is activated in all conditions of operation by the MASTERPOWER input and a separate switch is used for actuating the starter motor.

The modules are designed so that they are in a power-on condition only when one or more of a selected number of the inputs therefore are in the on condition. Thus some of the modules may shut down to a power-off or power-save condition when there is no input to the module on the selected number of inputs. In order to ensure that all of the modules are in the power-on condition when either AUX or RUN or MASTERPOWER is selected, these inputs are supplied to each of the modules as one of the selected ones of the modules. Thus the selection of AUX or RUN ensures that all modules are in the power-on condition. When neither AUX or RUN is selected, other inputs to selected ones of the modules will drive the respective module into the power-on condition while others, which are not receiving the power-on input conditions remain in the power-save condition with no outputs.

Each module drives a plurality of outputs indicated at output 1 through 6 respectively. Thus the total number of outputs required is the total of all of the outputs 1 through 6 and each module is selected to drive a predetermined combination of those outputs depending upon the design of the system.

The system further includes a programming port P which communicates with the communication bus at a suitable location thereon for receiving programming port from a suitable programming system which may be a PC as indicated at PC.

Figure 2:
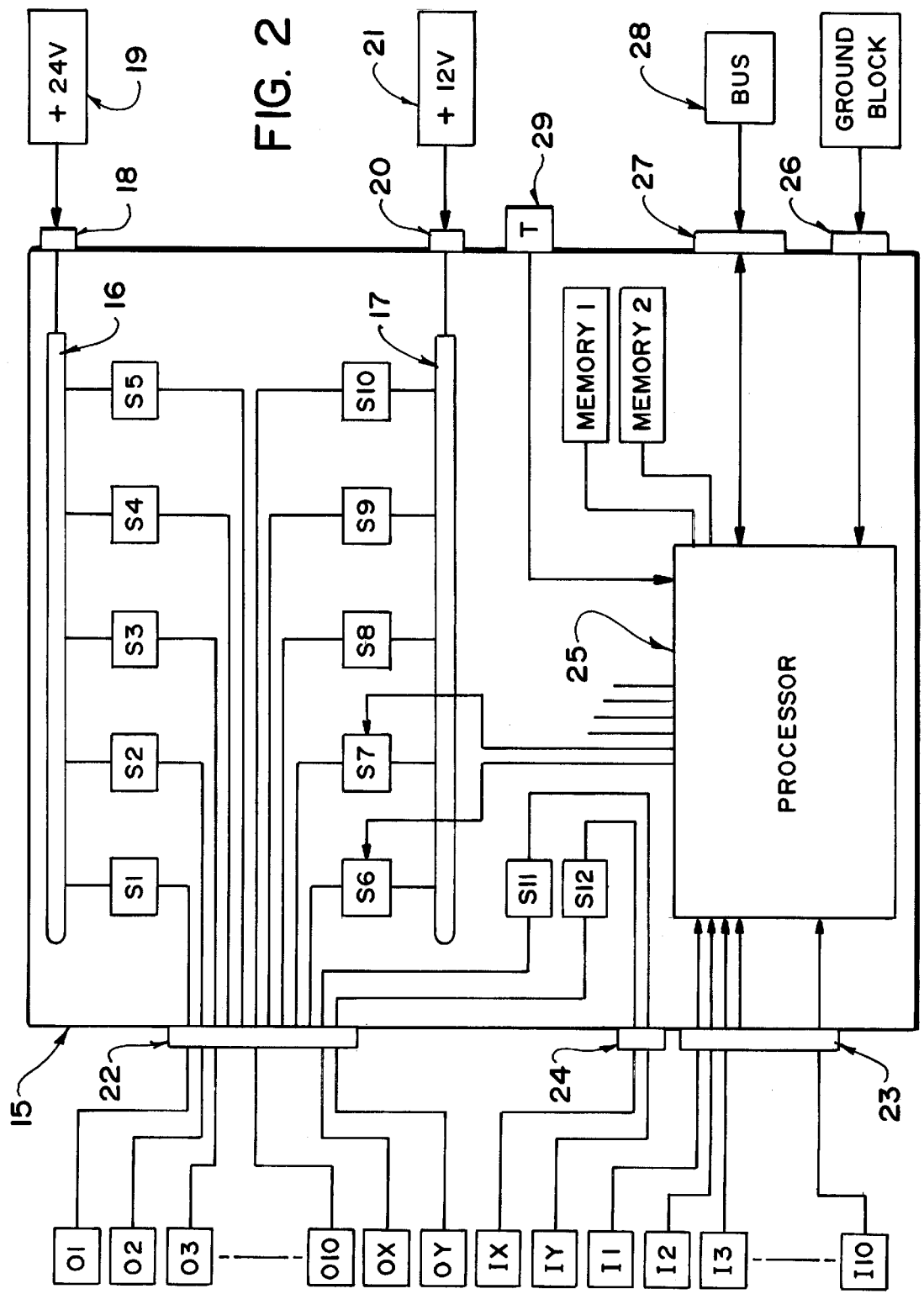
FIG. 2 is a schematic illustration of one of the modules.

Turning now to FIG. 2, the structure of each module is shown in combination with the elements associated with that module. Thus the module comprises a housing 15 which contains the module components and supports a plurality of terminals on the exterior surface of the housing for connection to the various inputs and outputs as described hereinafter.

The module includes a first power bar 16 and a second power bar 17. The first power bar is connected through an electrical connection to an input terminal 18 for receiving either 24 volts DC power from a source 19 on the vehicle or 12 volts DC from a source 21. The second power bar is connected to a terminal 20 for receiving either 24 volts DC from the source 19 or 12 volts DC power from the source 21. Thus each module may be used to supply only one of the available voltages or may be used to supply both voltages depending upon system requirements.

The power bar 16 is connected to a plurality of electronic switches S1 through S5 each of which controls communication of voltage from the supply 19 to a respective connector of an output terminal 22. The power bar 17 is connected to a plurality of switches S6 through S10 and again each of these controls supply of voltage from the source 21 to a respective connector of the terminal 22. The switches are preferably electronic but other electromechanical switches can be used in some cases. The number of switches can of course vary with requirements.

The terminal 22 provides therefore connectors for connection to selected outputs O1 through O10 which can be any component of the vehicle requiring at the set voltage and thus, depending upon the design of the system, the connector to the terminal 22 can be connected to selected vehicle components for supplying the necessary voltage thereto for operating the components as required.

The module further includes a terminal 23 which has a plurality of connectors each for connecting to a respective one of the inputs from the combination of inputs to that module, the inputs being indicated at I1 through I10. As set forth above, according to the design of the system, selected ones of the inputs I1 through I10 are arranged for connection to various input components of the vehicle of the system and thus provide an input to the module.

The module further includes a terminal 24 for connection to inputs IX and IY. These inputs are connected to switches S11 and S12 which can be actuated to supply the respective input to a respective output connector of the terminal 22 for connection to outputs OX and OY. Thus the module can be used not only to control the supply of high side voltage, that is a positive voltage line to the outputs O1 through O10 but in addition the module can be used to supply a required output to outputs OX and OY which can be low voltage connections or can be low side ground connections depending upon design requirements. The necessary output is thus applied at the selected input IX or IY and is controlled by the switch S11 or S12 as required. The switches S11 and S12 are both bi-directional for this purpose.

The module further includes a processor 25 which has a connection to the input terminal 23 so as to receive the inputs I1 through I10 as control inputs thereto. The processor further is connected to a terminal 26 which provides an input indicating to the processor which of the module functions M1 through M6 this particular is intended to carry out. One technique for the input from the terminal 26 is to provide a ground block which connects selected ones of a plurality of connectors of the processor to ground so that the particular ground connectors are selected in dependence upon the module location M1 through M6 to provide the required indication to the processor 25.

The processor 25 further connects to a terminal 27 communicating with the communication bus 14 through a connector 28. Thus the processor can provide two way communication to and from the communication bus.

The processor contains programming information including a base program stored in a memory 1 and an operating program stored in memory 2. These memory components are shown separately and schematically for convenience of illustration but it will be appreciated that in many cases the memory component will comprise a single memory chip where the base program and the operating program are stored as separate parts on the memory chip.

The system operates by providing a program in the operational program memory 2 which contains a series of separate sections each defining the function for a respective one of the modules so that each module as programmed with the operational program can carry out the function of each of the other modules. The processor receives the input from the terminal 26 to identify which module performs the respective program.

The inputs according to the design system to which the program has been created are attached at the input terminals 23 so as to provide the necessary inputs to the processor. The outputs are connected in accordance with the design arrangement so as to receive the required output from the required source.

During normal operation, each processor is activated into a power-on situation by the provision of an input to a selected number, for example inputs I1 to I5, of the total inputs I1 through I10 as determined by the hardware. Thus those modules required at any predetermined condition of the system are activated.

Each module is arranged so that the processor thereof communicates onto the communication bus data defining the current status of each of the inputs and each of the outputs of that module whenever there is a change of status.

The processor of each module thus receives the data on the communication bus and therefore has in an operating portion of the memory a current indication of the status of each of the other modules.

This data is used in conjunction with the inputs to that module from the inputs I1 through I10 under control of the designed operational program to actuate the switches S1 through S10 and thus determine the outputs. It will be appreciated that the program can be designed for various different characteristics of the system including many different arrangements of input and output. The program can be arranged to incorporated data from a number of the modules in actuating a particular output of a particular module. The program can be used to utilize a single input to one of the modules to actuate outputs at one or more of the other modules. The program can be used to generate feedback so that a sensor responsive to actuation by a certain output provides data for the communication bus which is fed back so that it is subsequent actuation only occurs if the first actuation has completed successfully. The program can be arranged to receive data from other elements connected to the communication bus and supplying status data to the bus, such as the engine control system, and to use that data in actuating selected outputs of the modules.

Figure 3:
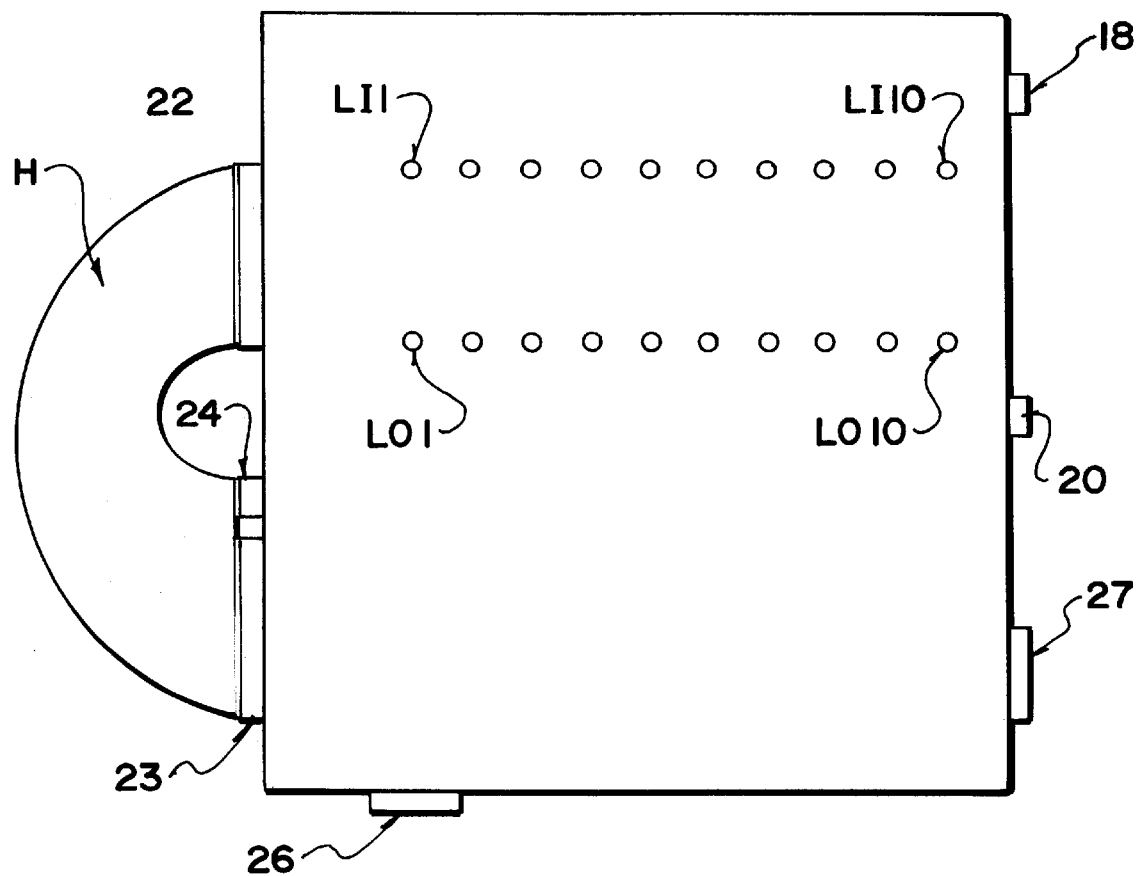
FIG. 3 is a schematic illustration of the exterior of the housing showing the status LEDs and a feedback harness for diagnostics.

As shown in FIG. 3, each module include two series of status LEDs for indicating to service technicians the operation of the modules. Thus the input connectors of the input terminal are associated with individual LEDs LI1 to LI10 of one series of the status LEDs which are arranged to be on when an input is present and off when no input is present. Each output connector is associated with a respective one of the second series of LEDs LO1 to LO10 to indicate the status of the respective output. Each LED is arranged to be on when an output is present, to be off when no output is present and to flash when a fault, such as a short or overload, is detected. This two series of status LEDs can be used with a feed back harness H to check the proper operation of the module. Thus a feedback harness is provided which allows a connection from each output to a respective one of the inputs. In the event that there are more inputs than outputs, or vice versa, connections can be doubled so that one output is connected to two inputs. The program is then actuated to run a diagnostic mode in which each output is actuated, to generate a respective input, and then to generate an output if each input is present. In such a situation, all status LEDs should be on and if they are not then a fault is present.

The modules are supplied in an initial condition in which the base program in memory 1 is installed and therefore enables the processor to carry out initial programming functions but does not enable the processor to carry out the necessary control of the outputs in dependence upon the operational program since that is not present.

The absence of the operational program therefore allows the module to be generic without dedication to a particular operational program. The module can therefore be re-programmed for different systems and schemes of operation to accommodate modifications over an extended life of manufacture of a particular product or various differences due to selection of particular options in the product.

It will be appreciated that the basic program includes a conventional communication protocol such as CAN which controls the operation and communication between the elements of the system.

In the event of initial installation of all of the modules, the modules are initially installed from the supply in the condition with the operational program omitted. When installed and connected as required, the necessary programming is applied to the communication bus for communication to each of the modules through the port P from the programming system PC. The program is therefore supplied into the memory using conventional programming techniques of data are supplied to be led into the memory of each processor together with a check sum and each processor in turn confirms by returning the check sum that the program portion has been properly installed. While usually the operational program is omitted, it is possible that another program will be already in place in one or more of the modules depending upon their source in which case the existing program is overwritten or replaced by the new programming relevant to the new situation.

As previously described, each module has the input from the terminal 26 which identifies to that module which function that module is intended to perform thus allowing the modules to be individually addressed during the programming procedure.

In the event of replacement of a module, should that module be defective or for some other reason, the replacement module is again generally supplied in a condition from the supplier in which the operational memory is omitted thus allowing the module to be generic and applicable to a number of different models of the product concerned. In some cases a replacement module may come from another source such as a spare part already used in another vehicle in which case it will contain an existing operational program which will be incorrect for the new system and will thus need to be replaced by the programming system described herein.

While the arrangement set out herein is intended and designed to allow replacement of only one module at a time, it is also possible to generate arrangements which will allow replacement of more than one module.

The module to be replaced is removed by disconnecting the various connections to the terminals and a replacement module is inserted in its place. Of course the replacement occurs in a condition with the power to the sources 19 and 21 disconnected so that the vehicle is in a power-off condition.

After the module is installed, the power is reconnected so that the vehicle enters the power-up condition. As previously explained, in the initial power up condition it is not necessary that all of the modules are moved into the power-on condition since some may remain inactive since they are not required in the initial condition of the vehicle. However, actuation of the vehicle ignition switches to the AUX, RUN or MASTERPOWER condition, is arranged as explained before so that each module is actuated to the power on condition. In most cases it is acceptable to cause the programming procedure to run at each power-up. However, in some cases it may be desirable to prevent this occurring except in a situation where a specific arrangement of inputs is actuated by the technician wishing to cause the procedure after installation of a module, thus defining a masterlock arrangement operable by the technician.

In this initial condition, when each module detects the AUX, RUN or MASTERPOWER input, the basic program is arranged, after running the conventional protocol for initial addressing, to cause each module to emit onto the communication bus a reference or identification number which forms part of the operating program together with an optional check sum calculated from the operating program.

The reference number forms part of the operational program and identifies the particular design of system used in this particular vehicle depending upon its time of manufacture and depending upon the option selected.

The base program of each of the processors causes the processors to receive the information emitted onto the communication bus by each of the modules. Since the replacement module does not contain the operational program. Any data transmitted by that module, from an existing operational program if any, likely does not contain the correct reference number nor the correct check sum since this has not been programmed into the module. The modules under the control of the base program thus compare the data emitted and a determination is made as to whether all are accurate and proper or whether one is inaccurate.

In the condition set forth above where the process of comparison of the reference numerals occurs at each power-up with the ignition in the AUX or RUN condition, in most cases the modules will determine that each of the modules contains the correct and accurate program.

However in the event that one of the modules becomes defective or is replaced and therefore does not contain the proper operational program, that module will emit to the communication bus a reference number and check sum which are inaccurate, that is different from those of the other modules. In this case, the base program is arranged to designate one of the modules to download from its memory the operation program onto the communication bus for loading into the replacement module.

Programming is carried out using conventional programming techniques so that each program portion is communicated with a check sum and the receiving module replies to confirm proper receipt by transmitting a calculated reply check sum.

The system therefore allows a generic module which is generic to a number of different designs of system to be installed subsequent to the initial programming at any time during the life of the vehicle and the system automatically programs the module so that it receives from the designated one of the modules the necessary operational program so that the modules can then commence operation in the normal operating manner.

Preferably the designated module is the module with the lowest number designation which would be module M1. In the event that module M1 is the replacement module, the base program is programmed to cause the next module which is module M2 to effect the downloading for programming the replacement module M1.

In order to avoid the necessity for the procedure of checking to be carried out at each power-up when no modules have been replaced, the system may be arranged so that an operator actuates a predetermined arrangement of inputs and only when these inputs are operational does the check program run.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A control apparatus comprising:
    a plurality of sources of input signals;
    a plurality of controlled elements;
    a communication bus;
    and a plurality of separate control modules each having:
        connection to the communication bus for transmitting communications on and receiving communications from the bus;
        a plurality of input terminals arranged for receiving at least one input from a respective one of said plurality of sources of input signals;
        a plurality of output terminals at least one of which is arranged for connection to a respective one of the controlled elements;
        a plurality of switches each associated with a respective one of the output terminals for effecting control of the respective controlled element;
        a processor programmable so as to actuate the switches in response to data from the input terminals and in response to said communications on the communication bus in accordance with a predetermined program stored in the module;
        the modules each having a different function such that each receives input from a different one or more of the sources of input data and each effects control of a different one or more of the controlled elements;
        wherein said predetermined program is the same in each of the modules and includes a base program and an operating program portion having respective sub-portions thereof with each sub-portion arranged to control the function of the respective module in which the program is stored;
        and wherein the modules and the predetermined program therein are arranged such that, at a predetermined condition of the apparatus, the processor of each module emits to the communication bus a signal indicative of the operating program portion stored in the respective module, such that there is effected a comparison of the emitted signals, and such that, in the event that the emitted signal of one of the modules is different from that of the others, a selected one of the others is arranged to download the operating program portion from said selected one to said different one.

2. The apparatus according to claim 1 wherein all of the modules are substantially identical and wherein each module has an input for determining which of the functions of the modules is applicable to that module.

3. The apparatus according to claim 1 wherein the emitted signal comprises a reference number included in the operating program portion and identifying the operating program portion together with a check sum calculated from the operating program portion.

4. The apparatus according to claim 1 including a port connected to the communication bus for receiving programming information on the communication bus for simultaneously programming all of the modules with said operating program portion.

5. The apparatus according to claim 1 wherein the predetermined condition is arranged to occur at an initial power-up of the apparatus.

6. The apparatus according to claim 1 wherein each of the modules is arranged to be in an operating condition only in the event that it is receiving an input on one or more of a selected number of the input terminals thereof and wherein the predetermined condition is arranged such that each of the modules is receiving an input to said selected number of input terminals thereof such that each is in the operating condition.

7. The apparatus according to claim 6 wherein the inputs to each module are arranged so that the predetermined condition only occurs at a power-up and only in the event that each of the modules is receiving an input to said selected ones of input terminals thereof.

8. The apparatus according to claim 1 wherein the predetermined program is arranged, in the event that the emitted signal of one of the modules is different from that of the others, to select a particular one of the modules to download the operating program portion unless the particular one is the different one in which case selects another one of the modules is selected.

9. The apparatus according to claim 1 wherein the selected one downloads the operating program portion in a plurality of separate sections of program each including a check sum.

10. The apparatus according to claim 1 wherein the control apparatus is provided in a vehicle for controlling electrical components of the vehicle.

11. The apparatus according to claim 10 wherein the modules are located at different locations in the vehicle including at least one at the front, at least one at the rear and at least one at an intermediate location along the length thereof.

12. The apparatus according to claim 10 wherein a first one of the modules is connected to a source of 12 vDC voltage and is arranged to control the switches thereof to provide the 12 vDC voltage as a high side output at least at some of the outputs thereof for supply to the controlled elements and a second one of the modules is connected to a source of 24 vDC voltage and is arranged to control the switches thereof to provide the 24 vDC voltage as a high side output at least at some of the outputs thereof for supply to the controlled elements.

13. The apparatus according to claim 12 wherein at least one of the first and second modules includes at least one further output having a bi-directional switch allowing connection of the switch to ground such that said one further output can provide a low side output.

14. The apparatus according to claim 1 wherein each module includes a set of input status LEDs and a set of output status LEDs and wherein each input is associated with a respective one of the input LEDs and each output is associated with a respective one of the output LEDs and wherein the input LEDs are arranged to be on when an input is present and to be off when no input is present and wherein the output LEDs are arranged to be on when an output is present and to be off when no output is present and to flash when a fault is present on the output.

15. The apparatus according to claim 14 wherein there is provided a diagnostic harness arranged to provide a feedback connection from respective ones of the output to respective ones of the inputs.

16. The apparatus according to claim 1 wherein each module is arranged to provide a power save mode wherein the module goes power-off except when an input is provided to selected ones of the inputs thereto.

17. A method of replacing a module in a control apparatus, the apparatus comprising:
  a plurality of sources of input signals;
  a plurality of controlled elements;
  a communication bus;
  and a plurality of separate control modules each having:
    connection to the communication bus for transmitting communications on and receiving communications from the bus;
    a plurality of input terminals arranged for receiving at least one input from a respective one of said plurality of sources of input signals;
    a plurality of output terminals at least one of which is arranged for connection to a respective one of the controlled elements;
    a plurality of switches each associated with a respective one of the output terminals for effecting control of the respective controlled element;
    a processor programmable so as to actuate the switches in response to data from the input terminals and in response to said communications on the communication bus in accordance with a predetermined program stored in the module;
  the modules each having a different function such that each receives input from a different one or more of the sources of input data and each effects control of a different one or more of the controlled elements;
  wherein said predetermined program is the same in each of the modules and includes a base program and an operating program portion having respective sub-portions thereof with each sub-portion arranged to control the function of the respective module in which the program is stored;
  the method comprising:
    replacing one of the modules with a replacement module;
    after replacement, at a predetermined condition of the apparatus, causing the processor of each module to emit to the communication bus a signal indicative of the operating program portion stored in the respective module;
    causing the modules to effect a comparison of the emitted signals;
    and, in the event that the emitted signal of one of the modules is different from that of the others, causing a selected one of the others to download the operating program portion from said selected one to said different one.

18. The method according to claim 17 wherein all of the modules are substantially identical and wherein each module has an input for determining which of the functions of the modules is applicable to that module.

19. The method according to claim 17 wherein the emitted signal comprises a reference number included in the operating program portion and identifying the operating program portion together with a check sum calculated from the operating program portion.

20. The method according to claim 17 wherein the predetermined condition is arranged to occur at an initial power-up of the apparatus.

21. The method according claim 17 wherein including, in the event that the emitted signal of one of the modules is different from that of the others, selecting a particular one of the modules to download the operating program portion unless the particular one is the different one in which case another one of the modules is selected.

22. A control module for use in a control apparatus, the apparatus comprising:

a plurality of sources of input signals;

a plurality of controlled elements;

a communication bus;

and a plurality of the control modules, each control module comprising:

a terminal for connection to the communication bus for transmitting communications on and receiving communications from the bus;

a plurality of input terminals arranged for receiving at least one input from a respective one of said plurality of sources of input signals;

a plurality of output terminals at least one of which is arranged for connection to a respective one of the controlled elements;

a plurality of switches each associated with a respective one of the output terminals for effecting control of the respective controlled element;

a processor programmable so as to actuate the switches in response to data from the input terminals and in response to said communications on the communication bus in accordance with a predetermined program stored in the module;

the module being arranged such that each has a different function such that each receives input from a different one or more of the sources of input data and each effects control of a different one or more of the controlled elements;

the module being arranged such that said predetermined program is the same in each of the modules and includes a base program and an operating program portion having respective sub-portions thereof with each sub-portion arranged to control the function of the respective module in which the program is stored;

wherein the module and the predetermined program therein are arranged such that, at a predetermined condition of the apparatus, the processor of each module emits to the communication bus a signal indicative of the operating program portion stored in the respective module, such that there is effected a comparison of the emitted signals, and such that, in the event that the emitted signal of one of the modules is different from that of the others, a selected one of the others is arranged to download the operating program portion from said selected one to said different one.

* * * * *